US007563339B2

(12) United States Patent
Gill et al.

(10) Patent No.: US 7,563,339 B2
(45) Date of Patent: Jul. 21, 2009

(54) CUTTING DEVICE

(75) Inventors: David Gill, Duffield (GB); Mark Gill, London (GB)

(73) Assignee: Relco U.K. Limited, Watford (GB)

( * ) Notice: Subject to any disclaimer, the term of this patent is extended or adjusted under 35 U.S.C. 154(b) by 0 days.

(21) Appl. No.: 11/755,096

(22) Filed: May 30, 2007

(65) Prior Publication Data

US 2007/0221334 A1 Sep. 27, 2007

Related U.S. Application Data

(62) Division of application No. 10/421,968, filed on Apr. 22, 2003, now Pat. No. 7,234,500.

(30) Foreign Application Priority Data

Apr. 24, 2002 (GB) ................................ 0209316.9

(51) Int. Cl.
*B32B 15/00* (2006.01)

(52) U.S. Cl. ....................... 156/250; 156/256; 156/261; 156/262; 156/264; 156/270; 156/355; 156/359; 156/361; 156/364; 156/518; 156/521; 83/170; 83/171; 53/478

(58) Field of Classification Search ....................... None
See application file for complete search history.

(56) References Cited

U.S. PATENT DOCUMENTS

| | | | | |
|---|---|---|---|---|
| 2,593,286 | A | | 4/1952 | Fermanian et al. |
| 2,642,116 | A | | 6/1953 | Fisher et al. |
| 3,491,651 | A | | 1/1970 | Pascoe |
| 3,587,377 | A | | 6/1971 | Olson et al. |
| 3,651,299 | A | * | 3/1972 | O'Neill ...................... 219/633 |
| 3,708,349 | A | * | 1/1973 | Macaulay et al. .......... 29/623.3 |
| 3,767,514 | A | | 10/1973 | Blossom |
| 3,909,326 | A | | 9/1975 | Renck |
| 4,071,942 | A | | 2/1978 | Kowallik |
| 4,380,484 | A | | 4/1983 | Repik et al. |
| 4,625,498 | A | | 12/1986 | Parsons |
| 4,960,480 | A | | 10/1990 | Iwamoto |
| 5,182,896 | A | * | 2/1993 | Maccherone ................. 53/478 |
| 5,396,050 | A | | 3/1995 | Ebihara et al. |
| 6,058,682 | A | | 5/2000 | Pajak et al. |
| 2003/0044481 | A1 | | 3/2003 | Beaudry |
| 2005/0274447 | A1 | | 12/2005 | Yadav et al. |

FOREIGN PATENT DOCUMENTS

| | | |
|---|---|---|
| DE | 2923559 | 1/1981 |
| DE | 19858268 | 3/2000 |
| DE | 10130476 | 3/2002 |
| EP | 0408896 | 1/1991 |
| EP | 0841132 | 5/1998 |
| EP | 1043146 | 10/2000 |
| FR | 1578732 | 11/1967 |
| GB | 1080184 | 8/1967 |
| GB | 1289298 | 9/1972 |
| GB | 1440922 | 5/2007 |

* cited by examiner

*Primary Examiner*—Philip C Tucker
*Assistant Examiner*—Kimberly K McClelland
(74) *Attorney, Agent, or Firm*—Smith-Hill & Bedell, P.C.

(57) ABSTRACT

A cutting device (10) for cutting a material (12) and providing a cut portion of the material (12). The device comprises a heating assembly comprising an electrical induction arrangement (32) for heating the cut portion of the material by induction heating.

10 Claims, 6 Drawing Sheets

10
12
14
16
17
17
18
20
20
21
24
26
28
30
32
34
35
36
40
49
II
A

CUTTING DEVICE

CROSS REFERENCE TO RELATED APPLICATION

This application is a divisional of U.S. patent application Ser. No. 10/421,968 filed Apr. 22, 2003, now U.S. Pat. No. 7,234,500 and claims priority under 35 USC 119 of United Kingdom Patent Application No. 0209316.9 filed Apr. 24, 2002.

FIELD OF THE INVENTION

The present invention relates to cutting devices and may also relate to transfer apparatus. Particularly but not exclusively, the invention relates to cutting devices and to transfer apparatus for adhering a foil portion to an object, such as the rim of an aperture, e.g. an open top of a container or other similar article having an opening.

BACKGROUND OF THE INVENTION

The use of a foil including a layer of heat sensitive adhesive to close and seal containers such as milk bottles and pill bottles is well known. A punch and die arrangement punches a foil portion of the required size directly into the cap from a foil sheet fed through the punch and die. The foil portion is delivered to the container as part of the cap, and an electrical induction system heats the foil, melting the adhesive and sealing the foil to the rim of the container.

SUMMARY OF THE INVENTION

According to one aspect of this invention there is provided a cutting device comprising a cutting member and a heating assembly for heating an article to be cut, the heating assembly being provided on the cutting member.

According to another aspect of this invention, there is provided a cutting device comprising a cutting arrangement for cutting a material and providing a cut portion of the material, and a heating assembly comprising an electrical induction arrangement for heating the cut portion of the material by induction heating.

Preferably, the material comprises a thermosensitive adhesive to be activated by the electrical induction arrangement.

According to another aspect of this invention, there is provided transfer apparatus to transfer a portion of a web of a material to an article, the material comprising a thermosensitive adhesive, and the apparatus comprising a cutting device to cut said web portion from the web and heating assembly to heat the web portion and activate the thermosensitive adhesive.

In one embodiment, the heating assembly may be provided on the cutting member. In another embodiment, the apparatus may include a holder holding the article, and the heating assembly may be provided on the holder.

Preferably, the material comprises a substrate on which the thermosensitive adhesive is provided. In one embodiment, the substrate is metallic. In another embodiment, the substrate may be a non-metallic material, particularly an electrically insulating material such as a plastics material.

Preferably, the heating assembly comprises induction means. In one embodiment, where the substrate is metallic, the web portion may be heated by induction heating.

Preferably, the apparatus includes a translation assembly for effecting relative movement between the cutting member and the article to bring the cutting member and the article together to effect said transfer of the web portion to the article.

Preferably the cutting member, is movable and may comprise a main body. The cutting member may comprise a cutting head or punch. Preferably, the cutting member is formed from a non-metallic material. Preferably the cutting member is formed from an electrically insulating material. The cutting member may be formed from a thermally insulating material. The cutting member is conveniently formed from a ceramic material. The heating assembly is preferably provided on the cutting member.

Desirably, the heating assembly comprises electrical coils provided on or in the cutting member. The electrical coils may be wound around or in the cutting member. The cutting member may be provided with a recess, which may be annular, to receive the coils, or in another embodiment, the cutting member may be hollow to receive said coils therein. In this other embodiment the cutting member may define a chamber and the electrical induction arrangement may be provided within the chamber. In this embodiment, the heating assembly may comprise coils wound around a former in the chamber.

In another embodiment, for example where the substrate is a non-metallic material, particularly an electrically insulating material, the cutting member may be provided with a metal face to engage the substrate. Preferably, the metal face comprises a metal layer on the cutting member. In this embodiment, the metal face may be heated by induction heating and said heated metal face may heat the cut portion. Preferably, the metal layer is a thin layer, and may have a thickness of 1 mm or less.

Preferably the translation assembly is provided to move the cutting member to the article to transfer the cut portion to and away therefrom after said transfer has been effected. Preferably the apparatus includes a power supply in communication with the heating assembly. The power supply may supply power continuously to the heating assembly, or may supply power intermittently to the heating assembly, and may supply the power in response to the position of the cutting member.

Preferably, the cutting device comprises a cutting guide arrangement which may be co-operable with the cutting member. The cutting guide arrangement may define a cutting passage therethrough, wherein the cutting member and the cutting guide arrangement are movable relative to each other so that the cutting member can be received in the cutting passage to cut the material.

The cutting guide arrangement may comprise a first cutting plate defining a first aperture through which the cutting member may be movable to the material. Preferably, the cutting guide arrangement comprises a second cutting plate defining a second aperture into which the cutting member may be movable after the material has been cut.

Preferably, the first and second cutting plates are arranged so that, in use, the cutting member is movable through the first aperture before cutting the material, and thereafter the cutting member may be movable through the second aperture.

In one embodiment, the cutting guide arrangement may comprise a housing to guide the cutting member. Preferably, the housing defines a guide passage therethrough. The guide passage is preferably aligned with the cutting passage.

Preferably the first and second cutting plates are spaced from each other by a material transport passage, the material being movable along the material transport passage. In one embodiment, the direction of movement of the cutting member is transverse to the direction of movement of the material.

Preferably the cutting device includes carrying means to carry the cut portion on the cutting member. The carrying means may comprise an engagement portion and vacuum means on the cutting member. The vacuum means may be operable to apply suction to the cut portion to hold the cut portion on the engagement portion prior to transfer of the portion to the article. The engagement portion may comprise an engagement surface.

Preferably the translation assembly is operable to move the cutting member between a first position in which the cutting member is spaced from the material, a second position in which the cutting member can cut the material from the web, and a third position in which the cut portion can be transferred to the article. Preferably, the first, second and third positions are arranged generally in a straight line relative to each other.

Preferably the apparatus includes a transfer arrangement for moving the material through the device. The transfer arrangement may operate intermittently in correspondence with the operation of the cutting member. Preferably the transfer arrangement includes a first reel for holding uncut material. The transfer arrangement may further include a second reel for holding waste material from which portions have been cut. The transfer arrangement may further include motive means for moving the web from the first reel to the second reel, the cutting member being operable on a section of the material between the first and the second reel.

The material preferably comprises a web, which is preferably in the form of a sheet of foil. The material may be provided with a layer of said thermosensitive adhesive.

The engagement portion may comprise a recess for receiving a part of the article, thereby deforming the cut portion around the article on transfer of the cut portion thereto.

Further according to the invention, there is provided container sealing apparatus for adhering a foil portion to the rim of a container, the apparatus being as described in the preceding eleven paragraphs.

According to another aspect of the invention there is provided a method of cutting a portion of a material, the method comprising cutting said material to provide a cut portion by induction heating.

Preferably, the material comprises a thermosensitive adhesive to be activated by the induction heating.

According to another aspect of this invention there is provided a method of transferring a portion of a material to an article, the material comprising a thermosensitive adhesive, and the method comprising providing a cutting member for cutting said portion from the material, providing a heating assembly comprising an electrical induction arrangement for heating said portion, and effecting relative movement between the cutting member and the article to bring the cutting member and the article together, actuating said heating assembly to activate the thermosensitive adhesive to transfer the web portion to the article.

In one embodiment, the heating assembly may be provided on the cutting member. In another embodiment, the apparatus may include a holder for holding the article, and the heating assembly may be provided on the holder.

Preferably, the material comprises a substrate on which the thermosensitive adhesive is provided. Preferably, the substrate is metallic. In another embodiment, the substrate may be a non-metallic material, particularly an electrically insulating material, such as a plastics material.

Preferably, the heating assembly comprises an electrical induction assembly. In one embodiment, where the material is metallic, the web portion can be heated by induction heating.

Preferably, the cutting member is moved to the article to transfer the cut portion, and thereafter is moved away therefrom after said transfer has been effected.

Preferably the cutting member comprises a main body. The cutting member may comprise a cutting head or punch. Preferably the cutting member is formed from a non-metallic material. Preferably the cutting member is formed from an electrically insulating material. The cutting member may be formed from a thermally insulating material. The cutting member is advantageously formed from a ceramic material.

Desirably, the electrical induction arrangement comprises electrical coils provided on or in the cutting member. The electrical coils may be mounted around the cutting member. The cutting member may be provided with a recess, which may be annular, to receive the coils.

In one embodiment, for example where the substrate is a non-metallic material, particularly an electrically insulating material, the cutting means may be provided with a metal face to engage the substrate, preferably, the metal face is a metal layer on the main body. In this embodiment, the metal face may be heated by induction heating and said heated metal face may heat the cut portion.

The step of effecting said relative movement includes guiding the cutting member to the web and may thereafter include guiding the cutting member to the article.

Preferably the first and second cutting plates are spaced from each other by a web transport passage, the web being movable along the web transport passage.

The method may further include the step of carrying the web portion on the cutting member. The step of carrying the web portion on the cutting member may comprise applying suction to said web portion to hold the web portion on the cutting member.

Preferably the cutting member is moved between a first position in which the cutting member is spaced from the web, a second position in which the cutting member can cut the web portion from the web, and a third position in which the web portion can be transferred to the article. Preferably, the first, second and third positions are arranged generally in a straight line relative to each other.

Preferably the method includes moving the web relative to the cutting member. The step of moving the web may comprise intermittently moving the web in correspondence with the operation of the cutting member. Preferably the step of moving the web includes providing uncut web on a first reel and may further include providing a second reel for holding waste web from which portions have been cut. The step of moving the web may include moving the web from the first reel to the second reel, the cutting member being operable on a section of the web between the first and the second reel.

BRIEF DESCRIPTION OF THE DRAWINGS

Embodiments of the invention will now be described by way of example only with reference to the accompanying drawings, in which.

DETAILED DESCRIPTION OF THE PREFERRED EMBODIMENT

Figure 1:
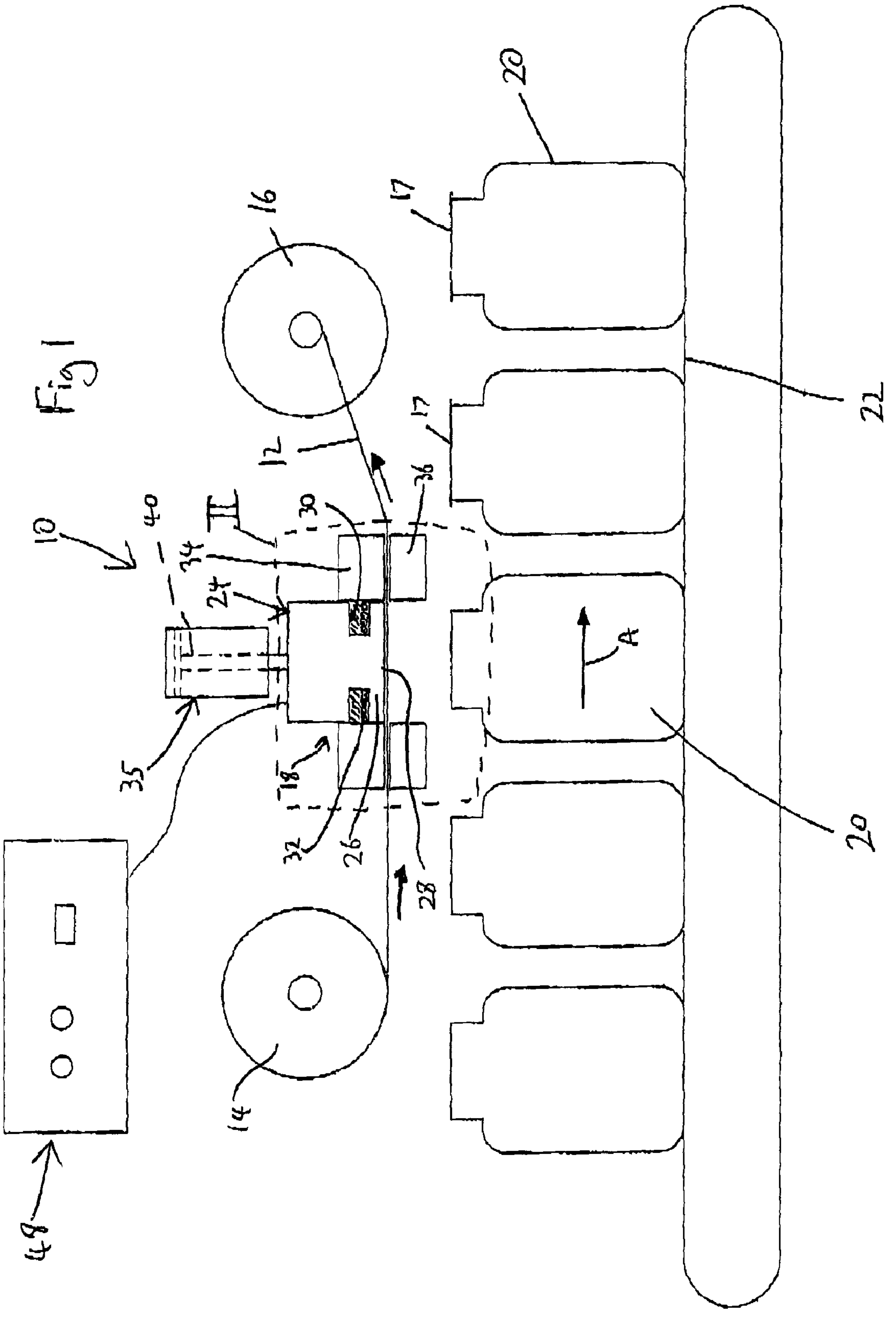
FIG. 1 is a schematic view of an embodiment of a cutting device.
Figure 2:
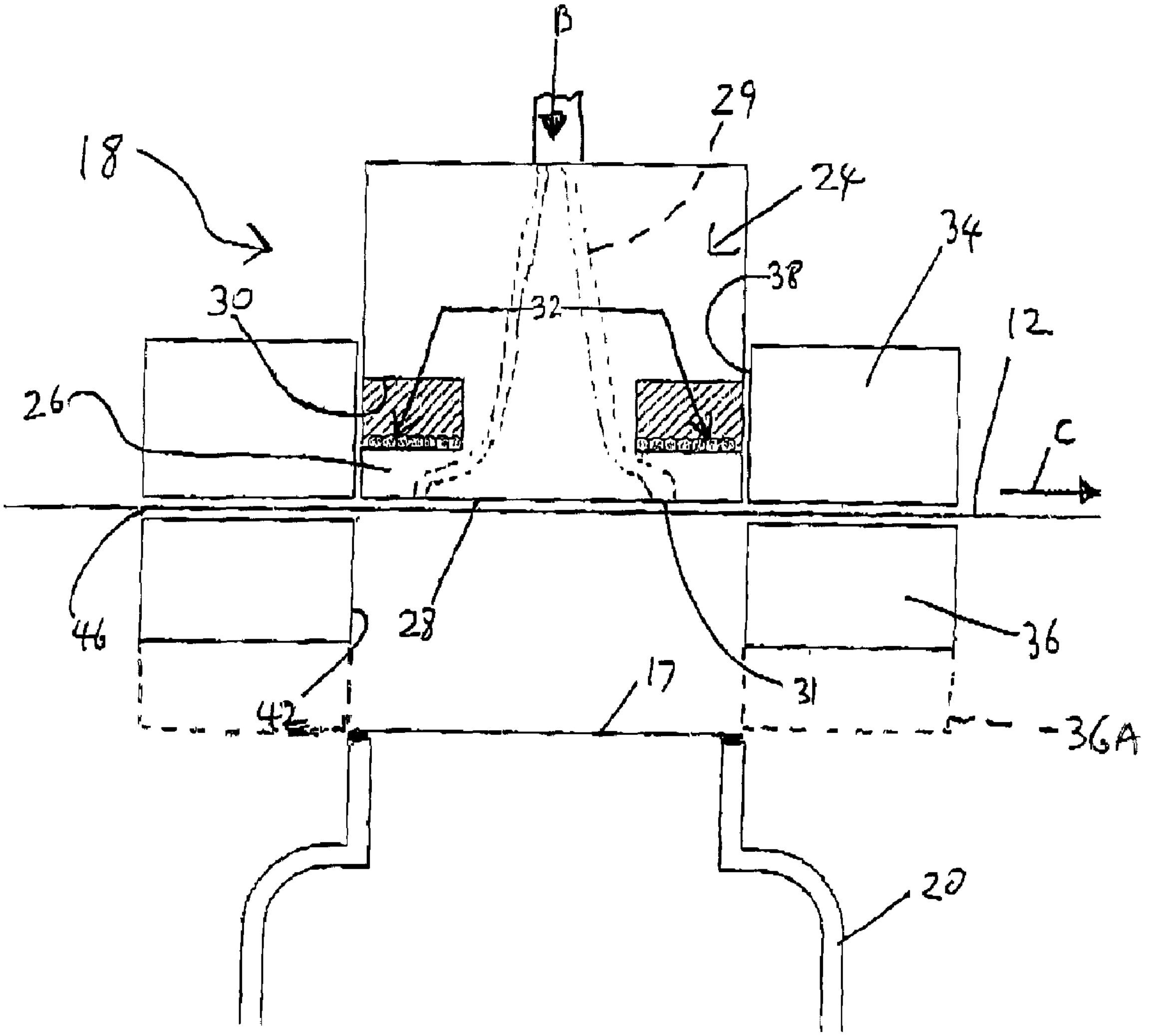
FIG. 2 is a sectional side view of the region marked II in FIG. 1.

Referring to FIGS. 1 and 2 of the drawings, there is shown a cutting apparatus 10 for cutting a portion of a web 12 of a foil material and transferring the cut portion to articles in the form of containers 20, for example bottles of a drink. The foil material is provided to seal the open tops of the containers 20. The web 12 of the foil material is formed of an aluminum foil, having a layer of a thermosensitive adhesive provided on the lower surface thereof. The web 12 is provided on a supply reel 14 and waste web is taken up on a waste reel 16. The web 12 extends through a cutting device 18 which cuts web portions 17 from the web 12. The web portions 17 are of a sufficient size and shape to fit over the top of the containers 20. The containers 20 are mounted on an endless belt conveyor 22 and are transported by the conveyor 22 in the direction indicated by the arrow A to bring each container 20 sequentially into position directly beneath the cutting device 18, as shown for receiving the web portion 17 thereon.

The cutting device 18 comprises a cutting member comprising a main body or cutting punch 24 having a web engagement portion 26 provided with an engagement face 28 to engage the portion out from the web.

The cutting punch 24 is generally cylindrical in configuration and defines an annular recess 30 in which is provided a heating assembly in the form of an induction coil 32. The apparatus 10 further includes a vacuum arrangement 31 to provide suction to hold the cut web portion 17 onto the engagement face 28. The punch 24 is provided with a plurality of conduits 29 leading to apertures 31 in the engagement face 28 to hold the web portion onto the engagement face 28 when the suction is applied.

The cutting device 18 further includes a cutting arrangement for receiving the cutting punch 24 in the form of first and second cutting plates 34, 36. The first cutting plate 34 defines a first cutting passage 38 to receive the cutting punch 24 so that the cutting punch 24 can cut the web 12.

An actuator 40 in the form of a piston arrangement 35 is provided to move the cutting punch 24 downwardly in the direction of the arrow B to effect the transfer and upwardly in the opposite direction to return the cutting punch 24 to its start position. The second cutting plate 36 defines a second guide passage 42 to guide the cutting punch 24 to the top of the container 20.

A web transport passage 46 is provided between the first and second cutting plates 34, 36, to guide the web 12 in the direction of the arrow C.

The apparatus 10 further includes an induction generator 48 to supply electrical power to the induction coil 32.

In operation, a web 12 of foil material is fed along the web transport passage 46 from a supply reel 14 and the end is mounted onto the waste reel 16. The cutting punch 24 is in the position shown in FIG. 1.

A plurality of containers 20 are arranged on the conveyor 22. The operation of the apparatus is appropriately programmed such that the conveyor 22 moves each of the containers 20 in turn underneath the cutting punch 24 and then stops. At this point the cutting punch 24 is in its first or start position. The actuator 40 then moves the cutting punch 24 downwardly to a second position to cut the web portion 17 from the web 12. The vacuum arrangement 31 is then operated to apply suction and hold the web portion 17 onto the engagement face 28 of the cutting punch 24. The actuator 40 continues its operation to move the cutting punch 24 downwardly to a third position at which the web portion on the cutting punch 24 engages the top of the container 20.

As the cutting punch 24 engages the container 20, the generator 48 supplies electrical power to the induction coils 32 which cause inductive heating of the metallic foil web portion 17. The technique of inductive or induction heating is a well known process and need not be explained here. The inductive or induction heating of the web portion 17 melts, or partially melts, the adhesive layer on the web portion 17 causing the web portion 17 to adhere to the top of the container 20.

The vacuum arrangment 31 is then switched off and the cutting punch 24 retracted to the initial position as shown in FIG. 1, with web portion 17 remaining adhered to the top of the container 20. The conveyor 22 then moves the containers 20 in the direction of the arrow A until the next container 20 is directly below the cutting device 18. The process described above is then repeated until all the containers 20 on the conveyor 22 are sealed with a web portion 17.

Figure 2A:
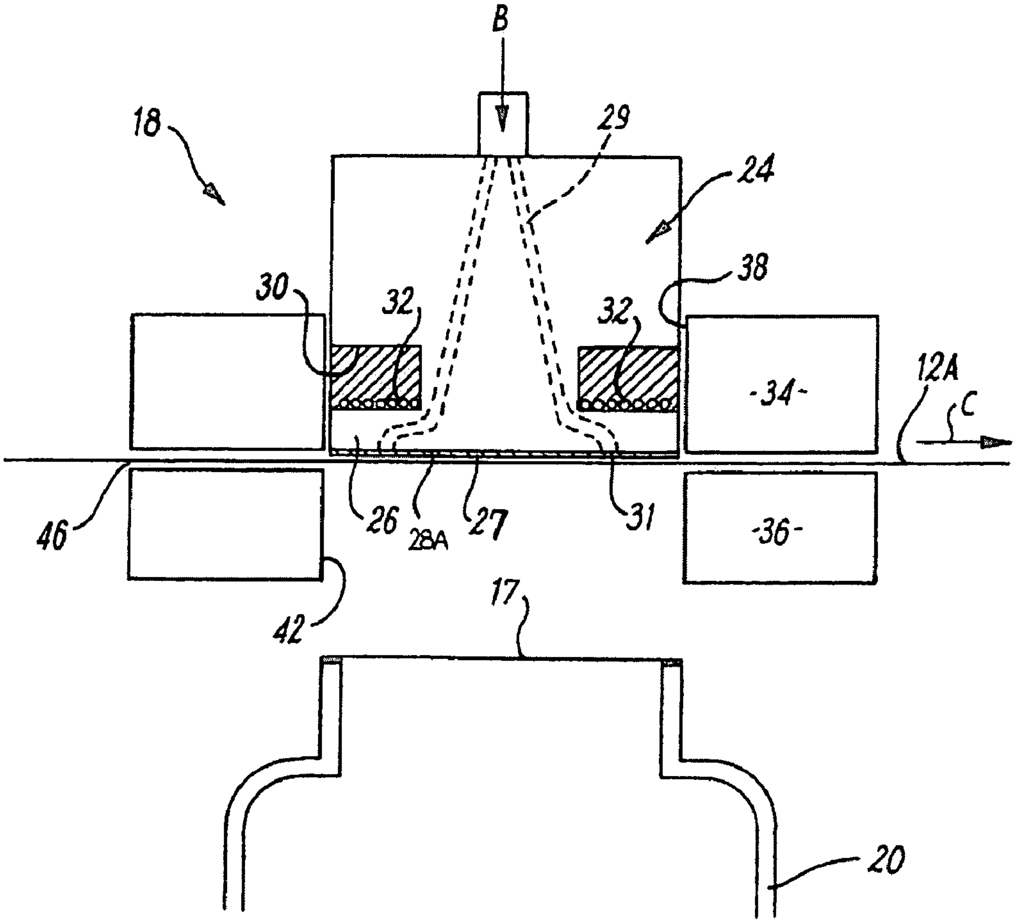
FIG. 2A shows sectional side view of a modification of the embodiment shown in FIG. 2.

A modification to the embodiment of FIG. 2 is shown in FIG. 2A, which is suitable for use with non-metallic, non-electrically conducting foils 12A. The modification shown in FIG. 2A comprises many of the features of the embodiment shown in FIG. 2 and these features are designated with the same reference numerals. In this modification, the cutting punch 24 has a lower face 28A and metallic engagement layer 27 provided thereon to provide a metallic face to engage the non-metallic foil 12A. With the modification shown in FIG. 2A, the coils 32 inductively heat the metallic engagement layer 27. The heated layer 27 heats adhesive on the non-metallic foil 12A to partially melt the adhesive, enabling the foil 12A to adhere tot eh top of a container 20.

Figure 3A:
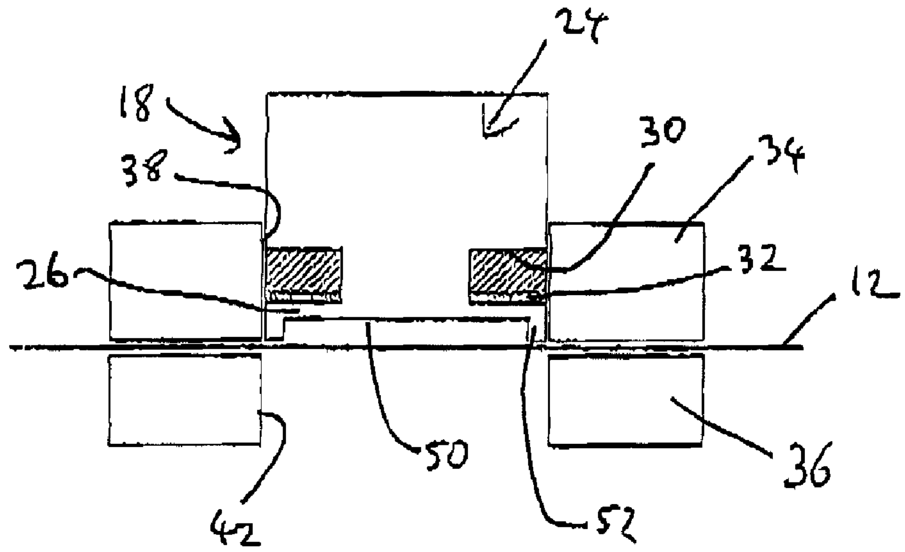
FIGS. 3A to 3C show three steps in the operation of part of another embodiment of the invention.
Figure 3B:
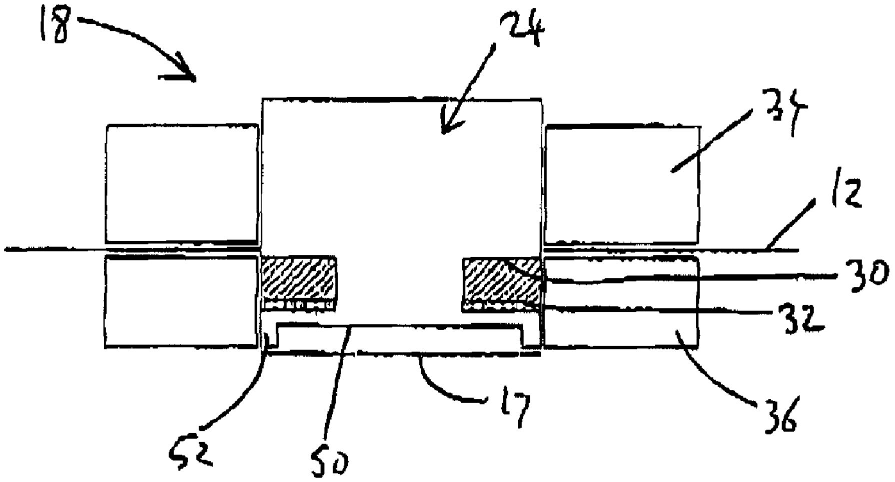
Figure 3C:
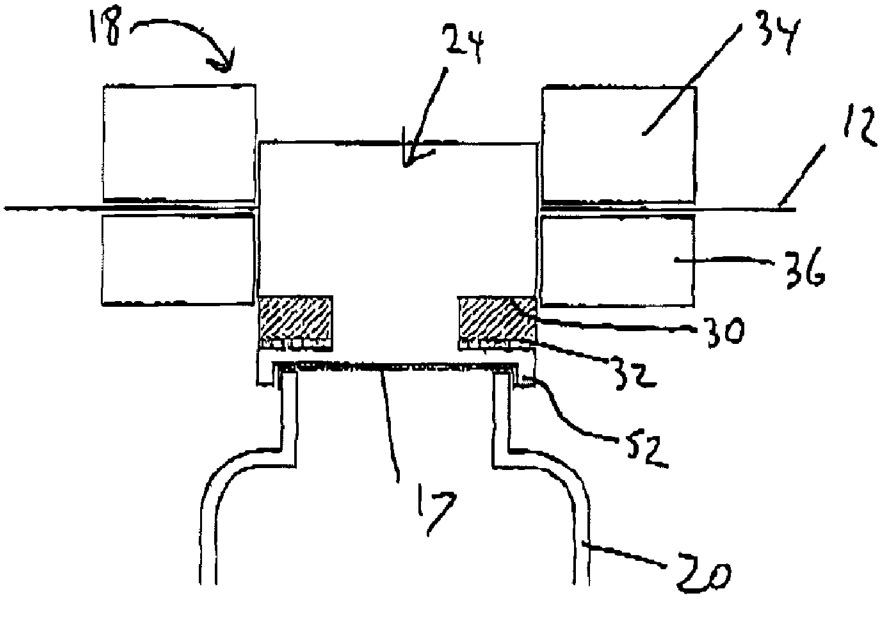

Referring to FIGS. 3A to 3C there is shown a further embodiment, which comprises many of the features of the embodiment shown in FIG. 1, and these have been designated with the same reference numerals. The embodiment shown in FIGS. 3A to 3C differs from the embodiment shown in FIG. 1 in that the engagement face 28 is in the form of a circular recess 50 having a downwardly depending circumferential edge region 52. The recess 50 is slightly larger than the top of the containers 20 such that the top of each container 20 can be received sequentially within the recess 50.

FIG. 3A shows the cutting punch 24 in its first position, and is then moved downwardly through the second position to cut the web portion 17 from the web 12. FIG. 3B shows the cutting punch 24 in a position intermediate the second and third positions.

Further downward movement of the cutting punch 24 to the third position as shown in FIG. 3C brings the web portion 17 into engagement with the top of the container 20. The top of the container 20 is received in the recess 50, thereby deforming the web portion around the outside of the top of the container 20. As can be seen from FIG. 3C, the downwardly depending edge region 52 enables the web portion 17 to be deformed so that it is a snug fit around the top of the container 20.

Figure 4:
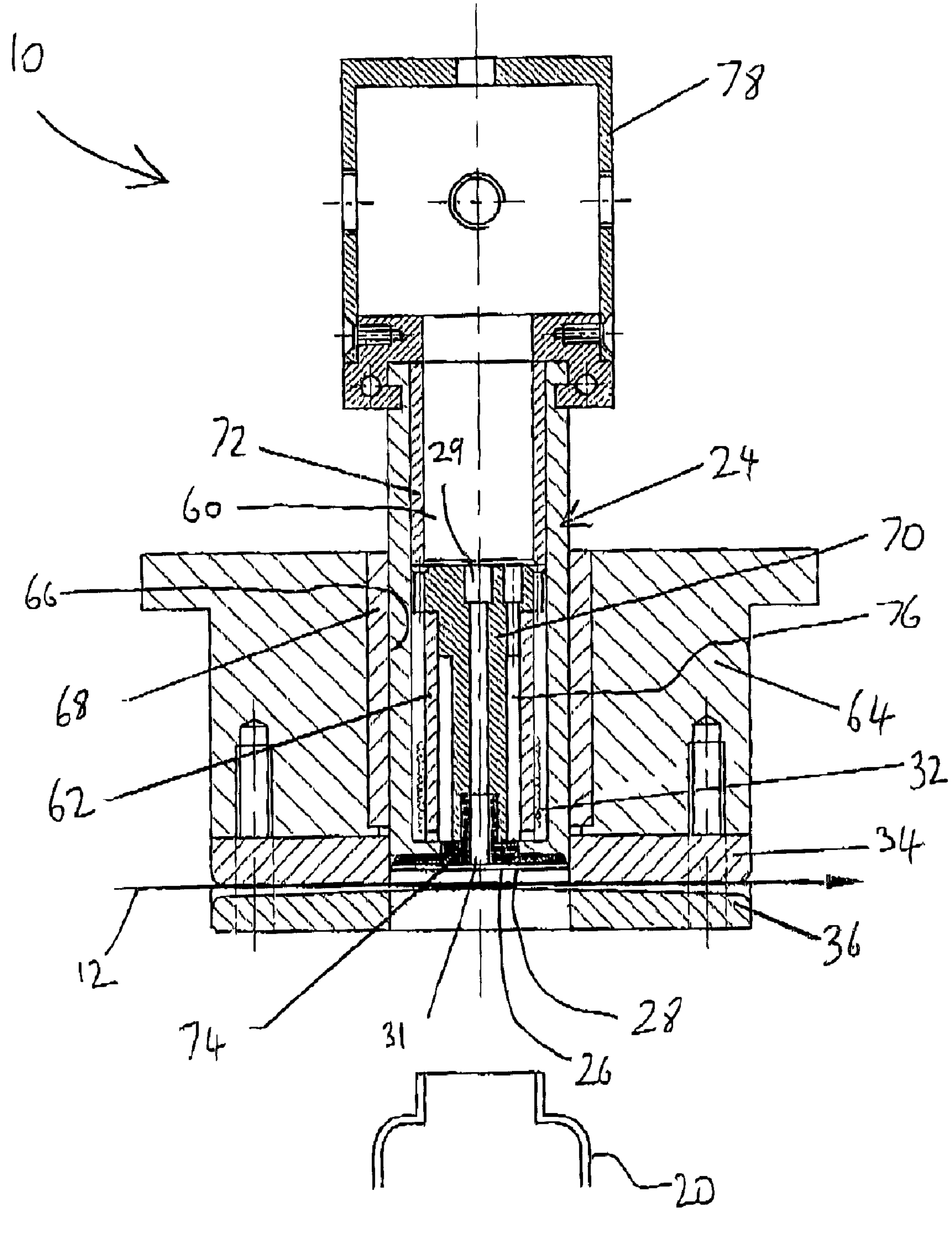
FIG. 4 is a sectional side view of a further embodiment.

The induction coils are actuated to heat the adhesive layer on the web portion 17 so that the web portion 17 adheres around the top of the container 20. A further embodiment of a transfer apparatus 10 is shown in FIG. 4. The apparatus shown in FIG. 4 comprises many of the features of the embodiments shown in FIGS. 1 to 3C, and these have been designated with the same reference numerals.

The apparatus shown in FIG. 4 differs from that shown in the previous embodiments, in that it comprises an elongate cutting punch 24 having a hollowed central region 60 in which a coil former 62 is provided around which the coil 32 is wound in a direction extending along the main axis of the elongate cutting punch 24. Also, the first and second cutting plate 34, 36 are connected to a guide housing 64 defining a central bore 66 in which is mounted a guide bearing 68. The cutting punch 24 slidably reciprocates within the bore 66. An internal member 70 is provided within the hollowed central region 60 and is held into position by a spacer 72 at the upper end thereof. The internal member 70 defines the vacuum conduit 29 to provide the vacuum for holding the cut foil onto the engagement face 28 of the cutting punch 24.

In the embodiment shown in FIG. 4, the engagement face 28 is provided on an insert 74 which may be formed of a suitable material, for example rubber. The engagement face 28 is provided on an engagement portion 26 formed of a suitable metallic material. The engagement portion 26 is, in turn, mounted on the rubber insert 74.

Cooling apertures 76 are provided within the internal member 70 for cooling the ceramic cutting punch 24.

A connector head 78 is attached to the cutting punch 24 and connects the cutting punch 24 to a suitable machine for effecting the reciprocating motion of the cutting punch 24.

Figure 5:
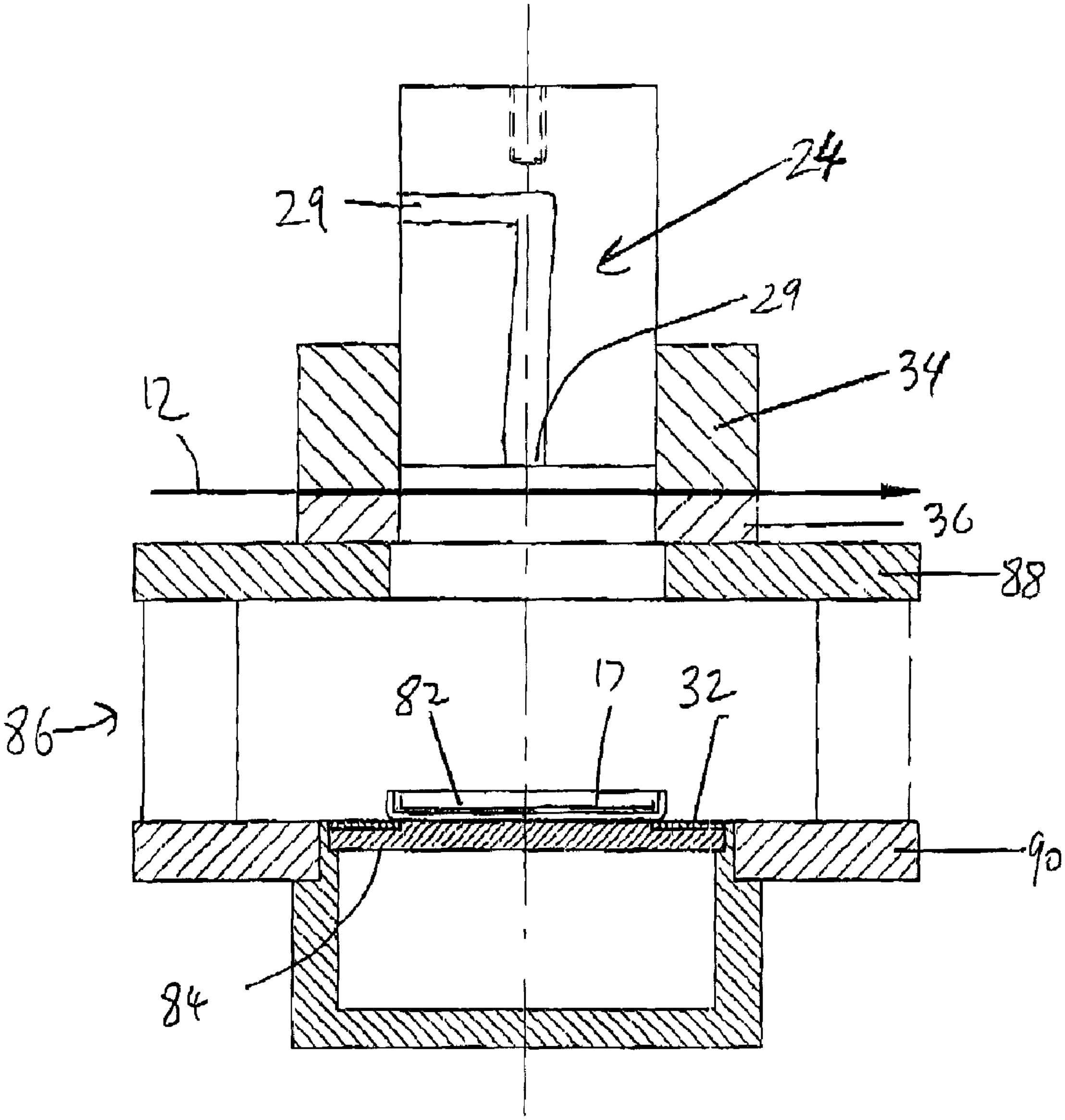
FIG. 5 is a sectional side view of another embodiment.

Referring to FIG. 5, there is shown a further embodiment suitable for applying sealing foil portions to the inside of a cap 82.

Again, the embodiment shown in FIG. 5 comprises many of the features of the embodiment shown in the earlier drawings, and these have been designated with the same reference numerals. In the embodiment shown in FIG. 5, the coil 32 is provided around a former member 84 which is separate from the cutting punch 24.

In operation, the cutting punch 24 cuts through the web 12 and delivers a web portion 17 into the cap 18. The induction coil 32 then heats up the web portion 17 while the cutting punch 24 presses the web portion 17 onto the cap 18 thereby activating the adhesives and adhering the web portion 17 to the inside of the cap 82. The cutting punch 24 then retracts upwardly to its position shown in FIG. 5 to repeat the operation.

The first and second cutting plates 34, 36 are mounted on a frame 86 comprising an upper frame member 88 upon which the cutting plates 34, 36 are provided and a lower frame member 90 upon which the former member 84 is provided.

Various modifications can be made without departing from the scope of the invention. For example, the foil material used in the embodiments shown in the drawings could be formed of a metallic material other than aluminum. Also, the foil material may be provided with adhesive on both sides. Also, the apparatus could be used to seal apertures in articles other than containers, for example apertures in valves, tubes or the like.

Other modifications that could be incorporated are that it is not necessary to use a belt conveyor. Instead, each container could be arranged under the cutting punch 24 by hand or fitted onto a rotary sealing machine.

A further modification is that in addition, or as an alternative to, the vacuum arrangement 31, the second cutting plate 36 is configured to guide the cutting punch 24 and the cut piece of foil material 17 to the container 20. With such an embodiment, the second cutting plate 36 extends to the top of the container 20, as designated by the numeral 36A in FIG. 2 and indicated by broken lines.

The above description discusses embodiments of the invention in terms of applying a foil material to seal the top of a container. It will be appreciated, that other embodiments could be used for applying materials to other articles.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of sealing a container, the method comprising:

cutting sealing material carrying a thermosensitive adhesive, using a linearly displaceable electrically insulating cutting member, to provide a cut portion of the sealing material, and thereafter transferring the cut portion of the sealing material to an open top of a container using the linearly displaceable cutting member, wherein the linearly displaceable cutting member cuts the sealing material to provide the cut portion and thereafter transfers the cut portion to an open top of a container in a single linear stroke;

heating the cut portion of the sealing material, using an electrical induction coil, following transfer to the open top of the container by the linearly displaceable cutting member and whilst held against the open top of the container by the linearly displaceable cutting member;

wherein the step of heating the cut portion of the sealing material melts the thermosensitive adhesive carried thereby to seal the cut portion of the sealing material to the open top of the container to seal the container.

2. A method according to claim 1, wherein the cutting member is formed from a non-metallic material.

3. A method according to claim 1, wherein the cutting member is formed from a thermally insulating material.

4. A method according to claim 1, wherein the cutting member includes a circumferentially extending cutting edge.

5. A method according to claim 1, wherein the sealing material comprises an electrically conductive material and the method comprises inductively heating the cut portion of the electrically conductive sealing material using the electrical induction coil, without heating the cutting member.

6. A method according to claim 1, wherein the sealing material comprises an electrically insulating material and the cutting member includes a metal face, and wherein the method comprises inductively heating the metal face using the electrical induction coil whereby to heat the cut portion of the electrically insulating sealing material and melt the thermosensitive adhesive carried thereby.

7. A method of sealing a container, the method comprising:

cutting a web of electrically conductive material carrying a thermosensitive adhesive, using a linearly displaceable cutting member, to provide a cut portion of the electrically conductive material, and thereafter transferring the cut portion of the electrically conductive material to an open top of a container using the linearly displaceable cutting member, wherein the linearly displaceable cutting member cuts the web of electrically conductive material to provide the cut portion and thereafter transfers the cut portion to an open top of a container in a single linear stroke;

inductively heating the cut portion of electrically conductive material, using an electrical induction coil, following transfer to the open top of the container by the linearly displaceable cutting member and whilst held against the open top of the container by the linearly displaceable cutting member;

wherein the step of inductively heating the cut portion of the electrically conductive material melts the thermosensitive adhesive carried thereby to seal the cut portion of the electrically conductive material to the open top of the container to seal the container, and further wherein the cutting member is formed from a material which is electrically insulating whereby the cutting member is not inductively heated during said step of inductively heating the cut portion of electrically conductive material.

8. A method according to claim 7, wherein the cutting member is formed from a non-metallic material.

9. A method according to claim 7, wherein the cutting member is formed from a thermally insulating material.

10. A method according to claim 7, wherein the cutting member includes a circumferentially extending cutting edge.

* * * * *